(12) United States Patent
Collins

(10) Patent No.: US 10,885,904 B2
(45) Date of Patent: Jan. 5, 2021

(54) ELECTRONIC SPEECH TO TEXT CONVERSION SYSTEMS AND METHODS WITH NATURAL LANGUAGE CAPTURE OF PROPER NAME SPELLING

(71) Applicant: MASTERCARD INTERNATIONAL INCORPORATED, Purchase, NY (US)

(72) Inventor: Robert Collins, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 106 days.

(21) Appl. No.: 16/197,869

(22) Filed: Nov. 21, 2018

(65) Prior Publication Data

US 2020/0160849 A1    May 21, 2020

(51) Int. Cl.
| | |
|---|---|
| G10L 15/187 | (2013.01) |
| G10L 15/22 | (2006.01) |
| G10L 15/30 | (2013.01) |
| G06Q 20/08 | (2012.01) |
| G06Q 20/34 | (2012.01) |

(52) U.S. Cl.
CPC ............ G10L 15/187 (2013.01); G10L 15/22 (2013.01); G10L 15/30 (2013.01); *G06Q 20/085* (2013.01); *G06Q 20/34* (2013.01); *G10L 2015/223* (2013.01)

(58) Field of Classification Search
CPC ....... G10L 15/187; G10L 15/22; G10L 15/30; G10L 2015/223; G06Q 20/085; G06Q 20/34

USPC .......................................................... 704/235
See application file for complete search history.

(56) References Cited

U.S. PATENT DOCUMENTS

| | | |
|---|---|---|
| 6,330,537 B1 | 12/2001 | Davis |
| 6,415,257 B1 | 7/2002 | Junqua |
| 7,624,007 B2 | 11/2009 | Bennett |
| 8,103,506 B1 * | 1/2012 | Meyer ..................... G06F 40/20 704/260 |
| 8,781,841 B1 * | 7/2014 | Wang ...................... H04M 3/56 379/205.01 |
| 9,190,063 B2 | 11/2015 | Bennett |
| 9,870,391 B1 * | 1/2018 | Strand .................. G06F 16/245 |
| 9,971,774 B2 | 5/2018 | Badaskar |
| 2001/0041980 A1 | 11/2001 | Howard |
| 2008/0028286 A1 * | 1/2008 | Chick .................. G06F 16/748 715/208 |
| 2008/0071533 A1 | 3/2008 | Cave |
| 2009/0112592 A1 | 4/2009 | Candelore |
| 2011/0153327 A1 * | 6/2011 | Iasso ...................... G10L 15/08 704/243 |
| 2016/0260433 A1 | 9/2016 | Sumner |

(Continued)

*Primary Examiner* — Quynh H Nguyen
(74) *Attorney, Agent, or Firm* — Armstrong Teasdale LLP

(57) ABSTRACT

A natural language processing system and method includes a computing device that applies a phonetic code algorithm to a received proper name uttered by a user and determines from a phonetic name database whether multiple different spellings of the name exist. The computing device recognizes an utterance of the user providing a natural language cue regarding the correct spelling of the name or provides a voice prompt to the user including a natural language cue regarding the correct spelling of the name, and converts the name to text including the correct spelling.

20 Claims, 7 Drawing Sheets

(56) References Cited

U.S. PATENT DOCUMENTS

| | | |
|---|---|---|
| 2017/0092278 A1 | 3/2017 | Evermann |
| 2017/0323637 A1* | 11/2017 | Naik .................. G10L 15/187 |
| 2017/0337177 A1 | 11/2017 | Maxwell, III |
| 2018/0225306 A1 | 8/2018 | He |
| 2018/0302460 A1 | 10/2018 | Hausler |
| 2018/0308486 A1 | 10/2018 | Saddler |

* cited by examiner

ELECTRONIC SPEECH TO TEXT CONVERSION SYSTEMS AND METHODS WITH NATURAL LANGUAGE CAPTURE OF PROPER NAME SPELLING

BACKGROUND

This disclosure relates generally to electronic natural language processing systems, and more specifically to natural language processing systems and methods providing speech to text conversion that requires accurate spelling of names to complete certain tasks.

Computer-implemented natural language processing systems have been adopted in a variety of different platforms and applications to provide voice-activated and/or voice response systems, including but not limited to the mobile device sector (e.g., smartphones and tablet computers), the auto industry in various types of infotainment and/or navigation systems, and various different types of home appliances and smart devices. Such systems are responsive to verbal inputs or voice commands of a user, with the systems processing the sound of the user's voice to interpret the input or command and take appropriate action in response.

State of the art automated, software-enabled virtual digital assistant features in so-called smart devices employing natural language processing have reached a level of sophistication allowing them to interact with human users on a conversational level. When adequately trained with the voice of a specific person, state of the art digital assistant systems are rather impressive in their ability to consistently interpret user questions and user requests in order to promptly provide answers and respond appropriately without mistake. Hands free use of such computer-implemented digital assistants without having to navigate through conventional menus and other interfaces to accept user inputs has been well received in the marketplace. So-called conversational interactive voice response (IVR) systems are being implemented in customer call centers and the like with similar advantages to digital assistant features, although they are typically designed for a more focused interaction to perform a limited number of predefined customer service tasks.

While in many applications, existing natural language processing systems work very well to implement digital assistant features and other customer interfaces, they are nonetheless limited in some aspects. Specifically, speech to text conversion for verbal inputs referencing proper names presents practical challenges to existing natural language processing systems, rendering them impractical or unsuitable to perform certain tasks. Improvements are accordingly desired.

BRIEF DESCRIPTION

In one aspect, the disclosure provides an electronic speech to text conversion system including a natural language processing computing device in communication with a phonetic name database. The natural language processing computing device is configured to receive at least one proper name uttered by a user, apply a phonetic code algorithm to the received proper name uttered by the user to create a phonetic code, and compare the created phonetic code to predetermined phonetic proper name codes stored in the phonetic name database. If the created phonetic code matches a predetermined phonetic proper name code in the database, the natural language processing computing device is configured to determine from the database whether multiple different spellings of the matching predetermined phonetic proper name code exists. When multiple different spellings exist of the name are determined to exist, the natural language processing computing device is configured to either: apply a phonetic code string from the database to recognize an utterance of the user providing a natural language cue regarding which of the multiple different spellings of the name is correct; or apply a phonetic code string to provide a voice prompt to the user including a natural language cue regarding which of the multiple different spellings of the name is correct. Finally, the natural language processing computing device is configured to convert the matching predetermined phonetic proper name code to text including the correct one of the multiple different spellings of the name.

In another aspect, the disclosure provides a method for electronically converting speech to text. The method is implemented with at least one host computing device having at least one processor in communication with a memory device. The method includes: receiving, by the at least one host computing device, at least one proper name uttered by a user; applying, by the at least one host computing device, a phonetic code algorithm to the received proper name uttered by the user to create a phonetic code; and comparing, by the at least one host computing device, the created phonetic code to predetermined phonetic proper name codes stored in the phonetic name database. If the created phonetic code matches a predetermined phonetic proper name code in the database, the method further includes determining from the database whether multiple different spellings of the matching predetermined phonetic proper name code exists; and when multiple different spellings exist of the name are determined to exist, either: applying, by the at least one host computing device, a phonetic code string from the database to recognize an utterance of the user providing a natural language cue regarding which of the multiple different spellings of the name is correct; or applying, by the at least one host computing device, a phonetic code string to provide a voice prompt to the user including a natural language cue regarding which of the multiple different spellings of the name is correct; and converting, by the at least one host computing device, the matching predetermined phonetic proper name code to text including the correct one of the multiple different spellings of the name.

DETAILED DESCRIPTION

Figure 1:
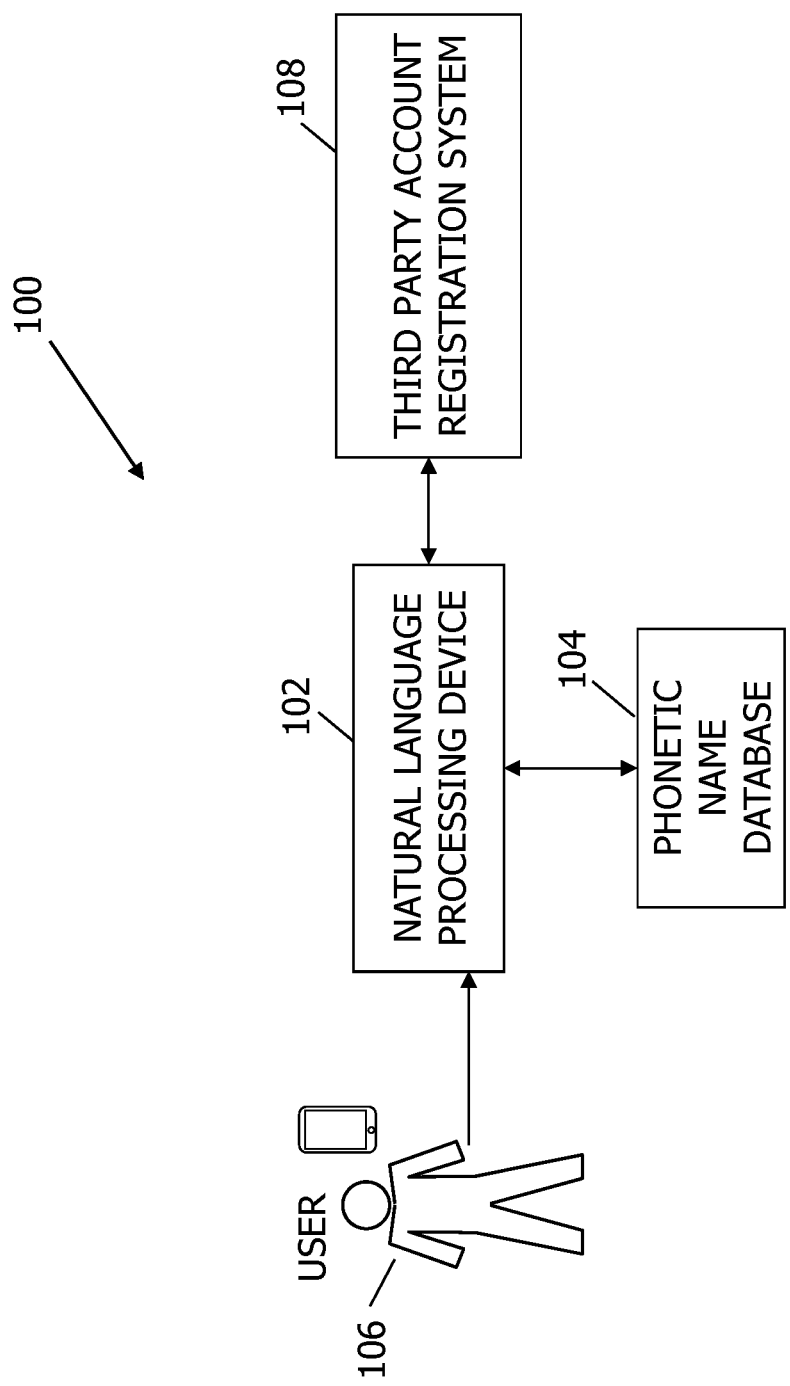
FIG. 1 is a schematic diagram illustrating a first exemplary embodiment of a speech to text conversion system including a natural language processing computing device providing a digital text input to a third party account or registration system.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

The system and methods of the disclosure as described below are configured to address certain problems and challenges in computer-implemented natural language processing systems to capture a correct spelling of a spoken proper name. The spelling of a proper name is important, for example, when the natural language processing system operates to convert the spoken name to text that is supplied to another computer-implemented system for further processing. Such challenges may arise, for example, in tasks such as registering a user for an online account with the assistance of a natural language processing system. In such an application, the natural language processing system accepts a verbal input of the account owner's name and other needed information to create an account, converts the verbal information to text, and supplies the text as a digital input to an external computer-implemented system for creation of the account. The proper spelling of name information in the text conversion is sometimes important to the proper operation of the system that needs to use it.

For certain types of account registration, proper identification of the account owner is central to the integrity and security of the system(s) that operate in reference to the account. For example, amongst other possible applications, when applying for a payment card or when opening an online account to remotely access payment card account information, the proper spelling of the cardholder's name and address (e.g., street name and city name) are important pieces of information to establish the proper identify of the cardholder. Existing natural language processing systems, however, are not well suited to reliably capture spoken names and convert them to text with the proper spelling in an efficient or convenient manner.

Existing natural language processing systems operate in reference to phonetic algorithms such as Soundex and Metaphone that index names and other words by sound, rather than by spelling. Accordingly, and by design, such algorithms operate to index two or more words having the same or similar pronunciation with the same representation or code that describes how the words sound. For example, using such a phonetic algorithm, words may be encoded and indexed by removing vowels and recording the beginning letter and the consonants of the word or a numeric representing the consonants. For example, the word "mark" may be indexed with the code of "m_rk" or M620, allowing the natural language processing system to phonetically match the sound of the word when spoken by a user to its code, allowing the word to be retrieved and a string of words/sounds to be interpreted. Considering the proper name "Mark" and its relatively common alternative spelling "Marc", phonetic algorithms are prone to errors in providing speech to text conversions as accurate spelling is not required by the devices in many other applications and/or they are generally designed to overlook spelling differences in performing most other tasks.

For example, in certain tasks performed by natural language processing systems, verbal input of proper names may be interpreted in reference to a contact list of a smart device, allowing the natural language processing system to specifically identify names that a user may speak. As such, when a user says "call Mark" the digital assistant will look for a contact that matches the phonetically indexed code of the sound of the name Mark. If there is more than one contact named "Mark" in the contact list, the digital assistant may ask the user for further clarification. For example, the digital assistant may rely on a surname to locate the proper person's phone number (e.g., "Do you mean Mark Smith or Mark Johnson?"), or otherwise prompt the user to identify or select which one of the two possible matches the user intends to call. In this example, the necessary clarification is simple and unobtrusive, and once the user replies to provide the clarification the digital assistant may easily proceed to call the proper person. In the case of two different contacts in the contact list actually being "Mark Smith" and "Marc Johnson", however, typical natural language processing systems need not make any attempt to distinguish the different spellings of "Mark" and "Marc" or engage the user on this issue. Instead, such systems are generally designed so that they are not reliant on spelling to operate.

In other cases, proper names may be spoken by a user to a natural language processing system that do not correspond to an existing contact or contact list, or in reference to an application where access to a contact list does not exist. For example, a user may ask a digital assistant "Who is Mark Twain?". This question is easily answered by a well-designed digital assistant based on the phonetic codes of "Mark" and "Twain" respectively, which can be converted to a digital text input that can then be used for an Internet query by the digital assistant. Given the notoriety of the author, his information will be found in the top search results, and a digital assistant may easily retrieve information about Mark Twain to satisfy the user request. In performing this type of task, it should be noted that Internet search engines nowadays are configured to return results with some tolerance of spelling errors in search queries. This is a built-in feature of search engines, and allows humans, and by extension personal digital assistants, to locate information without having to properly spell a search query. For example, a Google search for "Marc Twain" returns results for "Mark Twain", and a Google search for "Mark Twane" also returns results for "Mark Twain". As such, digital assistant devices can find information about Mark Twain without having to spell his name correctly.

Persons having similar sounding names but with different spellings quickly present issues in the performance of the natural language processing systems. For example, the question "Who is Marc Cohn?" may return different answers by a well-designed digital assistant based on the phonetic codes of "Marc" and "Cohn" respectively. Different spellings of each of the names Mark and Cohn will return different results concerning different people.

The name "Mark" and "Marc" when spoken by a user have identical pronunciation that that will be encoded the same in a typical indexed phonetic algorithm used by a natural language processing system. This is in many cases a primary advantage of the phonetic algorithm. For example, the U.S. Census Bureau has applied the Soundex algorithm as a tool providing a capability to locate names in census records that may have been recorded using different spellings. For example, in the event that the name "Marc" was recorded one or more times as "Mark" in the census records, records including both spellings can be found, and in combination with additional data points it may be appreciated that despite the different spellings that all of the records actually refer to the same person.

The same principle, and the same advantage, applies to digital assistant systems in certain tasks. Following one of the examples above, for the user request of "Call Mark" the response by a digital assistant using natural language processing system typically does not depend on whether a contact name is recorded (correctly or incorrectly) in a contact list as "Mark" or "Marc". In the coded indexing scheme of the phonetic algorithm it simply does not matter how the name is actually spelled. In a speech to text conversion application, however, whether the spoken name is converted to "Mark" or "Marc" is sometimes important, and conventional phonetic algorithms are vulnerable to mistake in this aspect even with relatively simple names, while simply being unable to recognize certain names. Smart phone users are likely familiar with errors produced in voicemail transcript services that use conventional phonetic algorithms, and therefore sometimes include misspelled names, or otherwise that include blanks where proper names should be in the voicemail transcripts.

Parallel issues to those above are extended to surnames. For example, the surname Smith and its alternative spelling of Smyth will be encoded in the same way in commonly utilized phonetic algorithms as the pronunciation is the same. In cases such as a user request call "Mark Smith" it typically does not matter whether or not the corresponding contact name is recorded as "Mark Smyth" or "Marc Smyth". In a speech to text application, however, whether the spoken name is converted to "Smith" or "Smyth" is consequential as it will either identify or misidentify the person actually being referenced.

Spelling issues can and do impact the user interaction and experience with a natural language processing system. The effect can sometimes be to the bemusement of the user. For example, in the case of a user question "Who is Marc Cohn?" a digital assistant device may return results relating to "Mark Cohen". The reader may realize that Marc Cohn is a Grammy Award winning singer-songwriter while Mark Cohen is a well-known American photographer. The reader may further realize that another Mark Cohen exists that is a rather well-known American comedian.

If the user is inquiring specifically about Marc Cohn, perhaps because they have seen a reference to his name, an answer provided by a digital assistant regarding Mark Cohen is not helpful. A trial and error process may result until the user is able to receive information about Marc Cohn. If the user has only heard the name Mark Cohn (but not seen it and hence may not be aware of the actual spelling of the name), she may or may not realize that Mark Cohen was not actually the subject of her inquiry. Subtle differences in spelling and pronunciation by the user may lead to confusion when interfacing with a digital assistant, and the same user making the same query may receive different results at different times. This can be unfortunate but typically is not perceived as a nuisance or irritation to a user of a natural language processing system. Most users understand the complexities involved in this type of task, and if the results do match the request the user will typically ask an additional or alternative question that is more detailed, in addition to a more careful enunciation of the name to help the digital assistant better perform the task.

Applications dependent on spelling in speech converted to text to operate properly can result in a failure to successfully or properly complete tasks which, from the user's perspective, appear to be simple tasks. For example, if Marc Cohn the singer-songwriter were to register for an online account using a digital assistant, his spoken name would likely either not be translated at all, or translated to text in an unpredictable manner. For example, Marc Cohn's name may be processed partly or entirely by a natural language processing system as an unknown or unrecognized word, or may be converted from speech to text as "Mark Cohn" (incorrect spelling of first name), "Mark Cone" (incorrect spelling of first and last name), "Mark Cohen" (incorrect spelling of first and last name), "Marc Cohen" (incorrect spelling of last name), or Marc Cohn (correct but in view of the alternative incorrect spellings probably unlikely). If the system incorrectly converts his name to text with an improper spelling, the account has not properly been set up, leading to potential problems in Marc being able to use or benefit from the account because of the misspelling of the name. This would of course be particularly unfortunate when the system records Marc's name with an improper spelling that is unbeknownst to him at the time. In some cases, a digital assistant could make an educated guess that Marc's name is spelled "Mark" as statistically speaking "Mark with a K" is the most common spelling, but in Marc's case it would be wrong.

Persons having certain names that are easily misinterpreted by other persons because of spelling idiosyncrasies are sometimes quick to offer cues to avoid misunderstandings. For instance, a person having the name Marc Cohn may, in a context where the correct spelling his name is necessary, attempt to clarify the spelling by offering a cue or shortcut explanation to the listener such as "Marc with a C" or "Cohn with no E" as an attempt to clarify that his name is not "Mark with a K" or "Cohen with an E". In human-to-human interaction, this may quickly succeed to clarify the spelling of his name with reduced chance of error by the listener. A similar attempt to clarify Marc's name to a digital assistant, however, will typically not succeed. That is, the spoken phrase "Mark with a C" is unlikely to be recognized as a cue that his first name is spelled "Marc" and not "Mark". The same is true for the spoken phrase "Cohn without an E". Instead of recognizing this as a spelling cue, a typical natural language processing system would either not recognize this as translatable text at all or would literally translate it to something like "Mark with a C" or "Mark with a sea" that would not facilitate successful account setup or use.

Address information presents parallel issues to those above. Both street names and city names may have the same pronunciation but different spelling. For example, street names of "Lewis Springs Rd" and "Louis Springs Rd" are possible, as are "Stuart Court" and "Stewart Court". City names such as "Barry" and "Berry" or "Winchester" and "Wynchester" are possible as well. Cues such as "Lewis with an e" or "Wynchester with a y" are similarly unlikely to succeed in a speech to text conversion using typical phonetic coding algorithms in a natural language processing system.

Considering that account registrations such as payment card account creation require the cardholder's actual name and address to properly complete, substantial difficulty will result for certain persons to complete the registration properly using digital assistants or other types of natural language processing systems. If the natural language processing system records the name "Marc" as "Mark" and "Cohn" as "Cohen" the payment card may issue in the wrong name or otherwise be denied. Likewise, the street and city names in the cardholder's address, if captured with an alternative spelling, may prevent correspondence from being received by the cardholder. This may happen without anyone realizing it for some time. For cardholder's that realize the potential misspelling(s) of required information and seek to be proactive to avoid mistakes, tools to facilitate an efficient process of capturing a name with proper spelling are lacking. Trial and error type of experimentation on a user's part to obtain the desired result is frustrating and negatively impacts user adoption of the system to perform certain tasks that cannot be completed with misspelled names.

For instance, to successfully complete a payment card transaction, the following information is typically required: the name of the payment card processor (e.g., Mastercard®, Visa®, American Express®), the name of the cardholder as it appears on the card, the primary account number (PAN) or the card number provided on the front of the card, the cardholder's billing address, card expiration information, and any security codes. In this context, the spelling of cardholder's name and billing address, when converted from speech to text, must exactly match the payment card account records or the transaction will be declined. Issues similar to those discussed above may frustrate a completion of a payment card transaction made by a user via a digital assistant. If the natural language processing system captures any element of the user's name (i.e., first name or last name) or an element of the address information (i.e., street name or city name) with improper spelling in the converted speech to text that is supplied to the payment card system, the transaction will be denied. Following the example above, if the cardholder's name is Marc, and a speech to text conversion of "Mark" results when Marc speaks his name, the transaction will be denied due to a mismatch with the cardholder account records.

Combining some of the examples above, the issues above can simply be daunting when simultaneously presented. Consider a cardholder named Marc Cohn who resides on Lewis Springs Road in the city of Barry. Given the combination of names Marc, Cohn, Lewis and Barry that may be spelled differently, a natural language processing system has low odds of capturing the spoken name and address with proper spelling when converting speech to text. If each of the first name, last name, street name and city name has only two possible spellings as discussed above, there are 16 possible combinations of the names including the various different spellings, 15 of which will result in a declined payment card transaction when converted speech to text. If just one additional variation of any of the four names was considered (e.g., city name spelling of Berry, Barry or Bari), 24 possible combinations of names would result, 23 of which would result in a declined payment card transaction when converted speech to text. It is not difficult to imagine even more difficult scenarios presenting even lower odds that a speech to text conversion will correctly spell proper names.

For example, there are at least six different variant spellings of the name "Layla", so considering a cardholder named Layla Cohn residing on Lewis Springs Road in the city of Barry, at least 48 combinations of the names including the various different spellings are possible, 47 of which will result in a declined payment card transaction when converted speech to text. There are at least eleven different variations of the name "Kaitlyn", so considering a cardholder named Kaitlyn Cohn residing on Lewis Springs Road in the city of Barry, at least 88 combinations of the names including the various different spellings are possible, 87 of which will result in a declined payment card transaction when converted speech to text. There are at least 32 different variations of the name "Katherine", so considering a cardholder named Katherine Cohn residing on Lewis Springs Road in the city of Barry, at least 256 combinations of the names including the various different spellings are possible, 255 of which will result in a declined payment card transaction when converted speech to text. Over a large user base, substantial issues are presented by these and other names that are not easily translated to text with existing natural language processing systems in an error-free manner with an efficient, pleasant, and positive user experience.

The systems and methods of the disclosure solve the issues above via a speech to text conversion system including a natural language processing computing device and a database of names including alternative spellings of certain names in the database. In reference to the database, the natural language processing system may execute rules and algorithms to proactively identify names and alternative spellings of names, and take steps to ensure that the correct spelling is made in speech to text conversion. Specifically, the natural language processing computing device may recognize a natural language cue uttered by a user concerning the spelling of the name, prompt a user for clarification of the spelling of the name prior to a speech to text conversion being finalized, or in some cases prompt a user to speak a full spelling of name letter-by-letter to ensure the correct spelling. The natural language processing computing device provides acknowledgment of spelling cues and/or confirmation of the correct spelling to the user. Errors in the spellings of names are therefore reduced, if not eliminated, prior the converted digital text being sent to an external computer system that operates upon the digital text in a spelling-dependent manner.

In one embodiment, the disclosure provides an electronic speech to text system including a natural language processing computing device in communication with a phonetic name database. The natural language processing computing device is configured to receive at least one proper name uttered by a user, apply a phonetic code algorithm to the received proper name uttered by the user to create a phonetic code, and compare the created phonetic code to predetermined phonetic proper name codes stored in the phonetic name database. If the created phonetic code matches a predetermined phonetic proper name code in the phonetic name database, the natural language processing computing device determines from the database whether multiple different spellings of the matching predetermined phonetic proper name code exists, and if multiple different spellings exist of the name exists, the natural language processing computing device is configured to either: apply a phonetic code string from the database to recognize an utterance of the user providing a natural language cue regarding which of the multiple different spellings of the name is correct; or apply a phonetic code string to provide a voice prompt to the user including a natural language cue regarding which of the multiple different spellings of the name is correct. Finally, the natural language processing computing device is configured to convert the matching predetermined phonetic proper name code to text including the correct one of the multiple different spellings of the name.

The natural language processing system may also be configured to provide a voice prompt to the user including a natural language prompt concerning the spelling of the name. The natural language processing system may provide a natural language prompt regarding at least one consonant in the spelling of the name or may provide a natural language prompt regarding at least one vowel in the spelling of the name. The natural language processing system may provide a plurality of successive natural language prompts that when answered by a user respectively converge on the proper spelling of the name.

If a number of the multiple different spellings exceeds a predetermined limit, the natural language processing system may further be configured to provide a voice prompt to the user to speak the full spelling of the name. Likewise, if none of the predetermined phonetic codes in the database matches the created phonetic code, the natural language processing system may provide a voice prompt to the user to speak the full spelling of the name.

The natural language processing system may be configured to create a phonetic code and compare the created phonetic code using at least one of a Soundex phonetic algorithm, a Metaphone phonetic algorithm, or a Beider-Morse phonetic matching algorithm. The natural language processing system may also obtain at least one location-based parameter of a user, and select one of a plurality of name groupings in the database based upon the obtained at least one location-based parameter. The natural language processing system may provide a confirming voice response to the user including a natural voice acknowledgment of a proper spelling of the name. The natural language processing system may also send the converted text to an external computer system as a digital input, and more specifically may send the converted text to a multi-party payment network system for processing a payment card transaction.

In another embodiment, the disclosure provides a method for electronically converting speech to text. The method is implemented with at least one host computing device having at least one processor in communication with a memory device. The method includes: receiving, by the at least one host computing device, at least one proper name uttered by a user; applying, by the at least one host computing device, a phonetic code algorithm to the received proper name uttered by the user to create a phonetic code; and comparing, by the at least one host computing device, the created phonetic code to predetermined phonetic proper name codes stored in the phonetic name database. If the created phonetic code matches a predetermined phonetic proper name code in the database, the method further includes determining from the database whether multiple different spellings of the matching predetermined phonetic proper name code exists; and when multiple different spellings exist of the name are determined to exist, either: applying, by the at least one host computing device, a phonetic code string from the database to recognize an utterance of the user providing a natural language cue regarding which of the multiple different spellings of the name is correct; or applying, by the at least one host computing device, a phonetic code string to provide a voice prompt to the user including a natural language cue regarding which of the multiple different spellings of the name is correct; and converting, by the at least one host computing device, the matching predetermined phonetic proper name code to text including the correct one of the multiple different spellings of the name.

The method may also include providing, by the at least one host computing device, at least one voice prompt to the user including a natural language prompt concerning the spelling of the name, and more specifically a natural language prompt regarding at least one consonant or at least one vowel in the spelling of the name.

If a number of the multiple different spellings exceeds a predetermined limit, the method may include providing a voice prompt to the user to speak the full spelling of the name. Likewise, if none of the predetermined phonetic codes in the database matches the created phonetic code, the method may include providing a voice prompt to the user to speak the full spelling of the name.

The method of claim may include creating a phonetic code and comparing the created phonetic code using at least one of a Soundex phonetic algorithm, a Metaphone phonetic algorithm, or a Beider-Morse phonetic matching algorithm. The method may also include obtaining at least one location-based parameter of a user, and selecting one of a plurality of name groupings in the database based upon the obtained at least one location-based parameter. The method may include providing a confirming voice response to the user including a natural voice acknowledgment of a proper spelling of the name, and sending the converted text to an external computer system as a digital input such as to a multi-party payment network system for processing a payment card transaction.

The technical problems addressed by the authentication and verification systems and methods of the disclosure include at least one of: (i) vulnerability of inaccuracies in electronic speech to text conversions using conventional phonetic algorithms; (ii) inability of natural language processing systems to interpret proper names correctly in electronic speech to text conversions; (iii) inefficiencies of natural language processing systems and software-enabled digital assistant features to perform certain tasks; (iv) errors in the operation of natural language processing systems due to spelling idiosyncrasies; (v) inability to reliably provide speech to text conversions for digital input into external computer systems that are spelling dependent; (vi) utilizing existing phonetic algorithms that are not spelling dependent in spelling-dependent applications of natural language processing systems and software-enabled digital assistant features; (vii) inability to provide voice-enabled online account creation with proper name spelling of account owner names; and (viii) inability to provide error free voice-enabled payment card transactions.

The authentication and verification systems and methods of the disclosure may be implemented using computer programming or engineering techniques including computer software, firmware, hardware, or any combination or subset thereof, wherein the technical effects may be achieved by (i) providing more effective tools to avoid inaccuracies in electronic speech to text conversions; (ii) enhancing user interaction to eliminate ambiguity of spelling of proper names in electronic speech to text conversions in reference to a phonetic name database; (iii) improving processing efficiency of natural language processing systems and software-enabled digital assistant features to identify and resolve alternative spellings of a plurality of proper names that are identified in advance as having alternative spellings; (iv) enhancing user interaction and implementing spelling cues to avoid errors in the operation of natural language processing systems due to spelling idiosyncrasies of otherwise phonetically matched names; (v) implementing verification of spelling of proper names prior to making speech to text conversions for digital input into external computer systems that are spelling dependent; (vi) supplementing existing phonetic algorithms that are not spelling dependent for spelling-dependent applications of natural language processing systems and software-enabled digital assistant features; (vii) introducing voice-enabled online account creation with proper name spelling of account owner names; and (viii) facilitating error free voice-enabled payment card transaction completion with a positive user experience.

The resulting technical benefits achieved by the authentication and verification systems and methods include at least one of: (i) electronic speech to text conversions with accurate spelling; (ii) efficiently resolving an ambiguity of spelling of a proper names in electronic speech to text conversions; (iii) improving processing efficiency of natural language processing systems and software-enabled digital assistant features to identify and resolve alternative spellings of proper names; (iv) implementing of natural language spelling cues to avoid errors in the operation of natural language processing systems due to spelling idiosyncrasies; (v) improved speech to text conversions for digital input into external computer systems that are spelling dependent; (vi) resolving challenges of existing phonetic algorithms that are not spelling dependent for use with spelling-dependent applications of natural language processing systems and software-enabled digital assistant features; (vii) desirably facilitating voice-enabled online account creation with proper name spelling of account owner names; and (viii) facilitating error free voice-enabled payment card transaction completion with a positive user experience.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows' environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Embodiments described herein may relate to a transaction card system, such as a credit or debit card payment system using the Mastercard® or Visa® payment network. The Mastercard® payment network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

FIG. 1 is a schematic diagram illustrating an exemplary speech to text conversion system 100 that includes a host natural language processing computing device 102 in communication with a phonetic name database 104 and a third party account/registration system 108. A user 106 may speak to the natural language processing device 102, which in reference to the phonetic name database 104 verbally captures the correct spelling of proper names (e.g., personal name, street name and) city name. The natural language processing device 102 converts speech of the user to digital text that is electronically input to the third party account/registration system 108.

The third party account/registration system 108 can be any system wherein spelling or misspelling of proper names will affect outcomes of either successfully creating an account, registering for a service, or completing a transaction that may be conducted via the third party account/registration system 108. For example in certain tasks relating to the third party account/registration system 108, an actual identity of an account owner is required and/or wherein actual address information is needed to confirm the identity of the account owner, to accurately locate a residence or physical location for services provided or delivery of ordered items, of for other transactional reasons. The third party account/registration system 108 may in various, non-limiting examples may relate to parental or student accounts for online access to school records and systems; insurance accounts for real property or vehicles; merchant accounts for goods and services; personal accounts for medical provider records and pet records; banking and financial accounts; investment accounts and retirement accounts; home or commercial utility accounts for phone, internet, electric, gas, water, sewer services, etc.; payment card accounts; travel booking and travel service accounts; rewards accounts; and other applications as desired.

Default rules and algorithms may be implemented by the natural language processing computing device 102 that ensure proper spelling of proper names in the speech to text conversions. The rules and algorithms operate in reference to a phonetic name database 104 allowing the natural language processing computing device 102 to identify names that are subject to alternative spellings, allow the natural language processing computing device 102 to recognize verbal spelling cues by the user and/or prompt the user for spelling clarification using the same type of verbal cues.

For example, the phonetic code of the names Mark and Marc remains the same using existing phonetic algorithms such as those described above wherein phonetic codes are generated that are descriptive of the sound of the name when spoken. As such, the phonetic algorithm may translate the name Mark to a phonetic code such as be m_rk or M620 in contemplated examples. Similar codes for any number of names may be included in the phonetic name database 104, including flags or indicators in the database 104 that different spellings of certain names having the same code exist. As such, the code m_rk or M620 is flagged with an indicator so that the natural language processing computing device 102 can know there are different spellings of this name (e.g., Mark or Marc) and take appropriate steps to identify and confirm which one of the spellings applies to the actual user speaking to the natural language processing computing device 102.

In a contemplated embodiment, a name such as Mark may be linked to a coded phonetic string in the database 104 that matches the sound of the phrase "Marc with a C" or "Mark with a K", such that if a user utters either phrase the natural language processing system will recognize it as a direction or cue to spell the name one way or the other, namely Mark (i.e., with a k) or Marc (i.e., with a c). When such a user provided verbal cue is recognized, the natural language processing computing device 102 can translate the name to text directly in the correct spelling without error. The natural language processing computing device 102 may acknowledge such a cue with a confirming reply to the user such as "Okay, Mark with a k". Different verbal cues and phonetic strings may be provided for various different names in the database that the natural language system may recognize when a user speaks them.

The verbal cues and corresponding phonetic strings may relate to a consonant in the spelling of a name as in the examples of Mark and Marc as described above wherein verbal cues concerning the consonants C or K may reveal the correct spelling of the name. As another example, a similar verbal cue involving a consonant may be "Gilliam with a G" that may distinguish the name Jillian with a J. As another example, a verbal cue utilized by the natural language processing computing device 102 may be "Allan with two L's" to distinguish the name Alan with one L. Numerous adaptions are possible in this regard, with the same goal of recognizing the type of natural language that a person may commonly use a shortcut to clarify the spelling of his or her name. Similar cues are also operative on surnames (e.g., "Smyth with a Y" to distinguish the name Smith with an I) as well as street names and city names amenable to shortcut spelling cues that are easily recognized and unambiguously applied to either convey the correct spelling of the name directly or at least to eliminate some of the variant spellings as a possibility.

The verbal cues and corresponding phonetic strings may also relate to a vowel in the spelling of a name. For example, when a user named Shari speaks her name as "Shari with an A", the natural language processing computing device 102 can rule out alternative spellings of the name that include the letter E.

Likewise, if the user does not utter a natural language cue, the natural language processing computing device 102 may verbally prompt the user to clarify the name via similar string of phonetic codes that are linked to certain names in the database 104. Again considering a user utterance that matches the phonetic code m_rk or M620, the natural language processing system may ask the user "Is that Mark with a k?", "Is that Marc with c?" or "Is that Mark with a k or Mark with a c?". By listening for the user's response, the natural language processing computing device 102 of the disclosure can easily know that Mark or Marc is the correct spelling and can translate it to text directly without error. Different cues may be provided for various different names in the database that the natural language system may use to verbally prompt a user for clarification of the spelling of a name in a natural way that is similar to questions that a person may ask who is aware of variant spellings of certain names. When the user's name is converted to text and is supplied to another computer system such as the third party account/registration system 108, account access or creation will succeed and issues in using the account or certain tasks and operations performed via the account will not denied because of spelling errors.

More than one rule may be applied by the natural language processing computing device 102 to the same name that is flagged in the database as being subject to different spellings. For example, Alan, Allen and Allan are three alternative spellings of identically pronounced names. As such, the corresponding phonetic code could be linked to successive phonetic strings that could be recognized or prompted by the natural language processing system 102 as spelling cues involving consonants or vowels allowing the natural language processing computing device 1112 to converge on the name that actually applies to a given user that is speaking to the natural language processing computing device 102. For example, the natural language processing computing device 102 may initially ask a user "Is that Alan with an a or with an e?" and after receiving the answer may subsequently ask "Is that Alan with one l or Alan with two l's?". Via the combination of the two prompts and answers from the user, the natural language processing system can know the proper spelling of the name and covert it to text without error, and when the name is supplied to the third party account/registration system 108 operational errors will not result that otherwise may be associated with spelling errors.

Three or more prompts may be utilized by the natural language processing computing device 102 for other names that cannot be reliably determined using only two prompts. For example, for a user named Cary the natural language processing computing device 102 may successive ask "Is that Cary with a C?", "Is that Cary with a Y" and "Is that Cary with A?" and "Is there one R or two?". This series of prompts would efficiently distinguish the names Cary and Kary from Cari and Kari, as well as Kery and Cery and Kerry and Carry, among others. Corresponding rules may be implemented name-by-name according to the particular issues presented.

Embodiments are also contemplated with a view toward some names in the database 104 that have so many iterations of spelling that natural language prompts or recognized phrases will either be unwieldy or not be successful to resolve spelling differences in order to converge on the correct spelling of a user's name as the user speaks with the natural language processing computing device 102. As such, a limit can be set for a predetermined number of alternative spellings of a name that is identified in the database 104, and when the predetermined number of spellings equals or exceeds the predetermined number, the systems and methods of the disclosure may simply prompt the user to spell the name so that the system can capture the spelling letter-by-letter to avoid mistakes or errors that may otherwise result.

For instance, the name "Layla" can be spelled in alternative forms including "Laila", "Lailah", "Laylah", "Leila" and "Leyla" in which corresponding simple rules and prompts to arrive at the correct spelling may not be easily or effectively implemented to narrow down the possibilities of spelling when speaking with a system user via the natural language processing computing device 102. As such, if the predetermined spelling limit is five iterations of spellings, when a user speaks the name Layla that has six iterations, the natural language processing computing device 102 defaults to asking the user to spell the full name, and when the user replies the natural language processing computing device 102 can capture the name letter-by-letter as the user speaks them (e.g., as the user speaks the individual letters L A Y L A as they appear in the user's name). The natural language processing computing device 102 can then make the speech to text conversion using the proper spelling for use by a spelling dependent application.

The natural language processing computing device 102 may operate according to known phonetic algorithms such as the Soundex algorithm, the Metaphone algorithm, and the Beider-Morse phonetic matching algorithms and their equivalents that may be enhanced via the phonetic name identifiers and rules linked to the names in the database 120 to accurately capture spellings of names across various different countries, locations and languages. As the aforementioned phonetic algorithms are well documented and well understood to those in the art, detailed description of the algorithms is not separately described herein.

Figure 2:
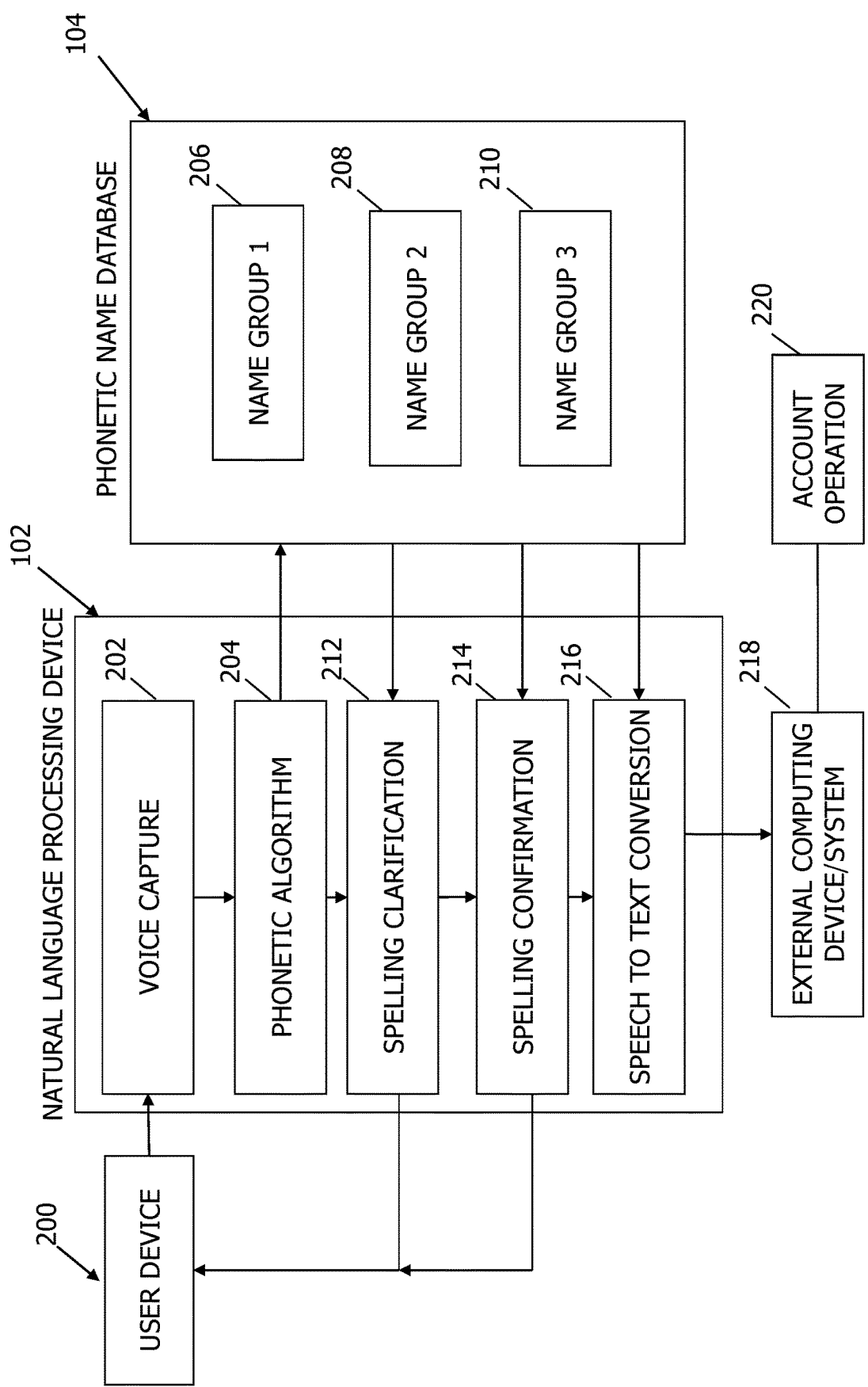
FIG. 2 illustrates an operational schematic diagram for the speech to text conversion system shown in FIG. 1.

FIG. 2 illustrates an operational schematic diagram for the natural language processing computing device 102. The natural language processing computing device 102 communicates with a user device 200 and includes voice capture components 202 that receive the phonetic sound of words and names uttered by the user. Phonetic algorithm components 204 operate on the received phonetic sounds to create phonetic codes that may be compared to predetermined phonetic codes stored in the database 104. The phonetic codes may be organized by name groups 206, 208, 210 in the database 104. The name groups 206, 208 and 210 may represent different countries (e.g., United States, Spain, France) of different languages (e.g., English, Spanish, French). As different language and their respective names tend to introduce different issues in the spelling of alternatives of certain names, and also tend to be phonetically distinct from names of other languages, such naming groups 206, 208, 210 can improve operational efficiency of the natural language processing computing device 102 while simultaneously avoiding false positives in matching of a phonetic sound uttered by a user and the phonetic codes in the different name groups 206, 208, 210. In further embodiments, the naming groups 206, 208, 210 can be categorized phonetically such as by the first letter/sound of the names in the database, number of syllables in the name, or other factors in order to reduce the number of phonetic comparisons needed to identify a name uttered by a user.

In view of the name groups 206, 208, 210 of the natural language processing computing device 102 can operate in response to a location-based-parameter of the user. That is, the natural language processing computing device 102 may select and use different ones of the naming groups 306, 308, 310 based on the locations of different users. The location-based parameter may be obtained via location services of the user device 200, via the settings of a personal digital assistant associated with the user device 200, via caller id features of the user device 200, via voice prompt to a user to identify their location, or by address information spoken by the user to the natural language processing computing device 102. For instance, the natural language processing computing device 102 may first ask the user to identify their country of residence, their city name of residence, their residential street name and information and finally for their given name and surname, with the system selecting the name group in the name database 102 based on the user's country of residence. Any number of name groups and alternative location-based parameters may be adopted in the system as desired. Also, in some embodiments, such location-based features in the operation of the natural language processing computing device 102 may be considered optional and need not be utilized.

The phonetic algorithm components 204 of the natural language processing computing device 102 operate in reference to one or more of the name groups in the database 104 to compare phonetic codes of sounds uttered by a user to predetermined phonetic codes stored in one or more of the name groups in the database 104. For names having various different spellings, identifiers and links in the database 104 tell the natural language processing computing device 102 that more than one spelling exists and let the natural language processing computing device 102 know which rules and phonetic code strings to apply so that the applicable spelling of the user's name or address information can be recorded correctly in a speech to text conversion. Executing the applicable rules, spelling clarification components 212 in the natural language processing computing device 102 recognize natural language spelling cues (e.g., Marc with a C) received from the user via the user device 200, or to provide natural language voice prompts including cues (e.g., Mark with a K) to the user via the user device 200. When the user replies, spelling confirmation components 214 generate a voice response from the natural language processing computing device 102 to confirm the spelling to the user (e.g., "Okay, Marc with a C"). The spelling confirmation by the natural language processing computing device 102 may include the full spelling of the name (e.g., "Okay, M A R C")

to avoid any possible misunderstanding. The user may optionally confirm the spelling confirmation with "Yes" or "Correct" or correct the natural language processing computing device 102 with a "No" or "incorrect" to restart the name spelling identification.

Once the correct spelling is verified, the name information is converted via speech to text components 216. The converted name with the accurate spelling may be a digital input to an external computing device or system 218 and account operation 220 that is dependent on the spelling of the name operation supplied. The external computing device or system 220 may be any other device or system in which accurate name spelling is beneficial or desired, for example, to specifically identify a person via actual name and residential address with proper spelling. The natural language processing computing device 102 may be implemented in whole in part as a software-enabled digital assistant system, as a conversational interactive voice response in a call center, or in other applications wherein issues are presented by misspelling of certain proper names that are desirably avoided.

Figure 3:
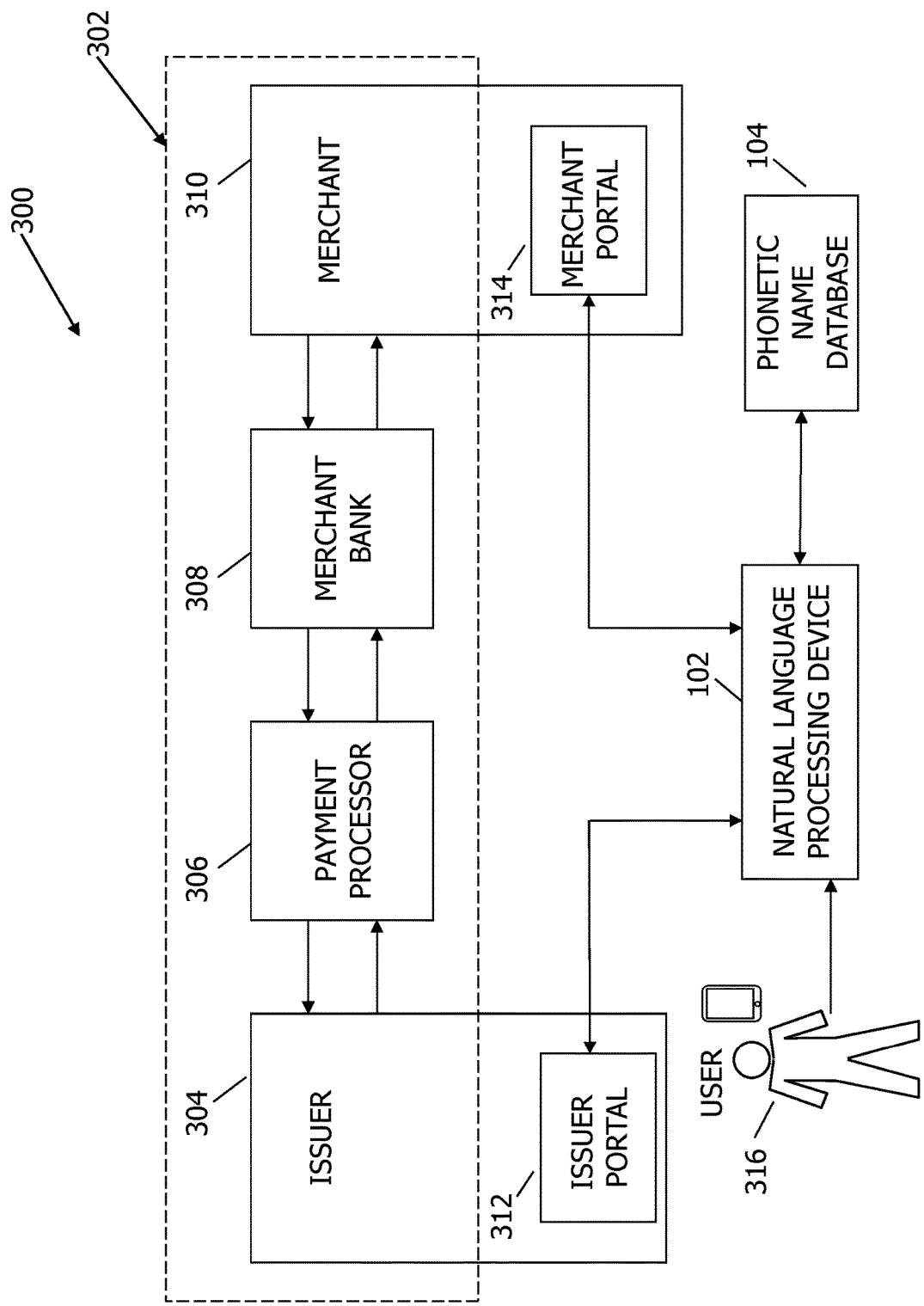
FIG. 3 is a schematic diagram illustrating a second exemplary speech to text conversion system including a natural language processing computing device that is operative with respect to a payment processing network system.

FIG. 3 is a schematic diagram of a speech to text conversion system for processing of payment card account information or payment card transaction information via the natural language payment processing computing device 102 and a payment card processing system 302, such as a credit card payment network using a payment processor network 306 such as the Mastercard® payment network 306 according to a proprietary communications standard promulgated by Mastercard International Incorporated for the exchange of financial transaction data between financial institutions that are registered with Mastercard International Incorporated. (Mastercard is a registered trademark of Mastercard International Incorporated located in Purchase, N.Y.).

In payment card processing system 302, a financial institution, such as an issuing bank 304, issues a payment card, such as a credit card account or a debit card account, to a cardholder 316, who uses the payment card to tender payment for a purchase from a merchant 310. To accept payment with the payment card, merchant 310 must normally establish an account with a financial institution that is part of the financial payment system. This financial institution is usually called the "merchant bank" or the "acquiring bank" or simply "acquirer".

When a cardholder 316 tenders payment for a purchase with a payment card (also known as a financial transaction card), the natural language processing device 102 receives verbal payment card information from the cardholder 316 and converts the verbal payment card information to text, which is turn electronically provided by the natural language processing device 102 to the merchant 310. The merchant passes an authorization request through merchant bank 308 and the payment network 306 to issuer 304 for the amount of the purchase. Alternatively, merchant bank 308 may authorize a third party to perform transaction processing on its behalf. Such a third party is usually called a "merchant processor" or an "acquiring processor."

Using payment network 306, the computers of merchant bank 308 or the merchant processor will communicate with the computers of issuing bank 304 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated, an authorization code, and/or other transaction identifiers that may be used to identify the transaction.

The payment network 302 may be configured to process authorization messages, such as ISO 8583 compliant messages and ISO® 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

During the authorization process of the payment card processing system, the clearing process is also taking place. During the clearing process, merchant bank 308 provides issuing bank 304 with information relating to the sale. No money is exchanged during clearing. Clearing (also referred to as "first presentment") involves the exchange of data required to identify the cardholder's account such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated, which identifies that specific transaction. When the issuing bank 304 receives this data, it posts the amount of sale as a draw against the available credit in the cardholder account and prepares to send payment to the merchant bank 308.

When a request for authorization is accepted, the available credit line or available account balance of cardholder's account is decreased. Normally, a charge is not posted immediately to a cardholder's account because bankcard associations, such as Mastercard International Incorporated, have promulgated rules that do not allow a merchant to charge, or "capture," a transaction until goods are shipped or services are delivered. When a merchant 310 ships or delivers the goods or services, merchant 310 captures the transaction by, for example, appropriate data entry procedures on the point-of-sale terminal. If a cardholder 316 cancels a transaction before it is captured, a "void" is generated. If a cardholder 316 returns goods after the transaction has been captured, a "credit" is generated.

After a transaction is captured, the transaction is settled between merchant 310, merchant bank 308, and issuing bank 304. Settlement refers to the transfer of financial data or funds between the merchant's account, merchant bank 308, and issuing bank 304 related to the transaction. Usually, transactions are captured and accumulated into a "batch," which is settled as a group.

The natural language processing computing device 102 is in communication with an issuer portal 312 or a merchant portal 316 and provides a speech to text conversion as a digital input to either one. The speech to text conversion is made with correct spelling of proper names as described above so that transactions may proceed without hindrance of misspelled names.

Cardholder 316, using a cardholder computing device, may use the services of the natural language processing computing device 102, via voice activation and voice response features, to access issuer portal 312 and create on online access account to review and retrieve payment card information or otherwise interact with an issuer computing device. A user may also enroll as an authorized user or enroll for a payment card services using the issuer portal 312 and the natural language processing computing device 102. The created account is spelling dependent, and the natural language processing computing device 102 is configured to capture the proper spelling of proper names spoken by a user (e.g., given name, surname, residential street name and city name). The converted digital text input to the issuer device is therefore accurate in the spelling of names for full use and enjoyment of the account by the user, as well as to ensure the security and integrity of the issuer computing device and the larger payment system 302 for processing payment card transactions.

Cardholder 316, using a cardholder computing device, may also access merchant portal 314 via the services of the natural language processing computing device 102 and its voice activation and voice response features, to make a purchase from the merchant 310 using a payment card. The natural language processing computing device 102 provides a speech to text conversion of the payment card information needed to complete the transaction to the merchant portal 314. The merchant system 310 is spelling dependent in order to complete a transaction via the payment network 302, and the natural language processing computing device 102 is configured to capture the proper spelling of proper names spoken by a user (e.g., account owner's given name, surname, street name and city name of the account billing address). The converted digital text input to the merchant device is therefore accurate in the spelling of names for approval of the transaction, as well as to ensure the security and integrity of the merchant computing device and the larger payment system 302 for processing payment card transactions.

Figure 4:
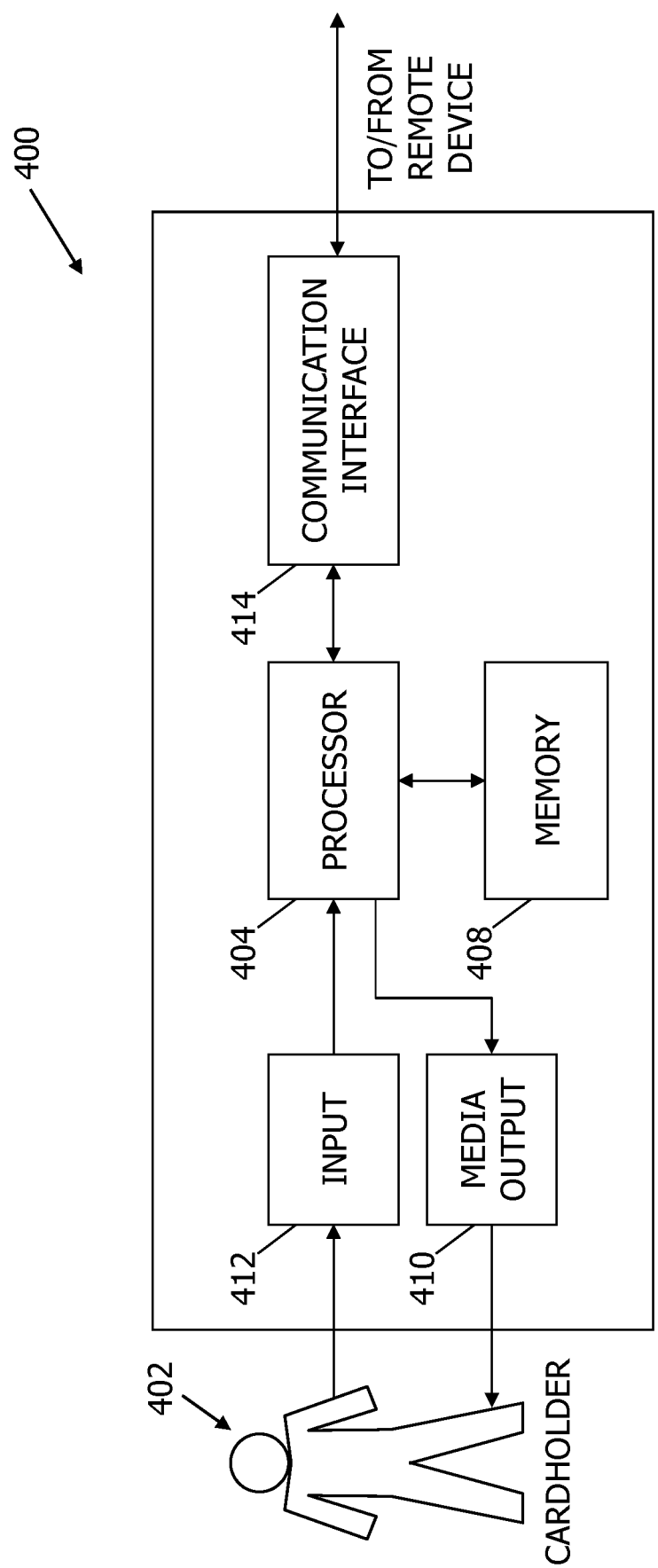
FIG. 4 illustrates an example configuration of a user device for the systems shown in FIGS. 1-3.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device such as the natural language processing computing device, another computing device in the card payment system network or with other remote computing devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of the merchant, and possibly others to effect the system as shown in FIGS. 1 and 2. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
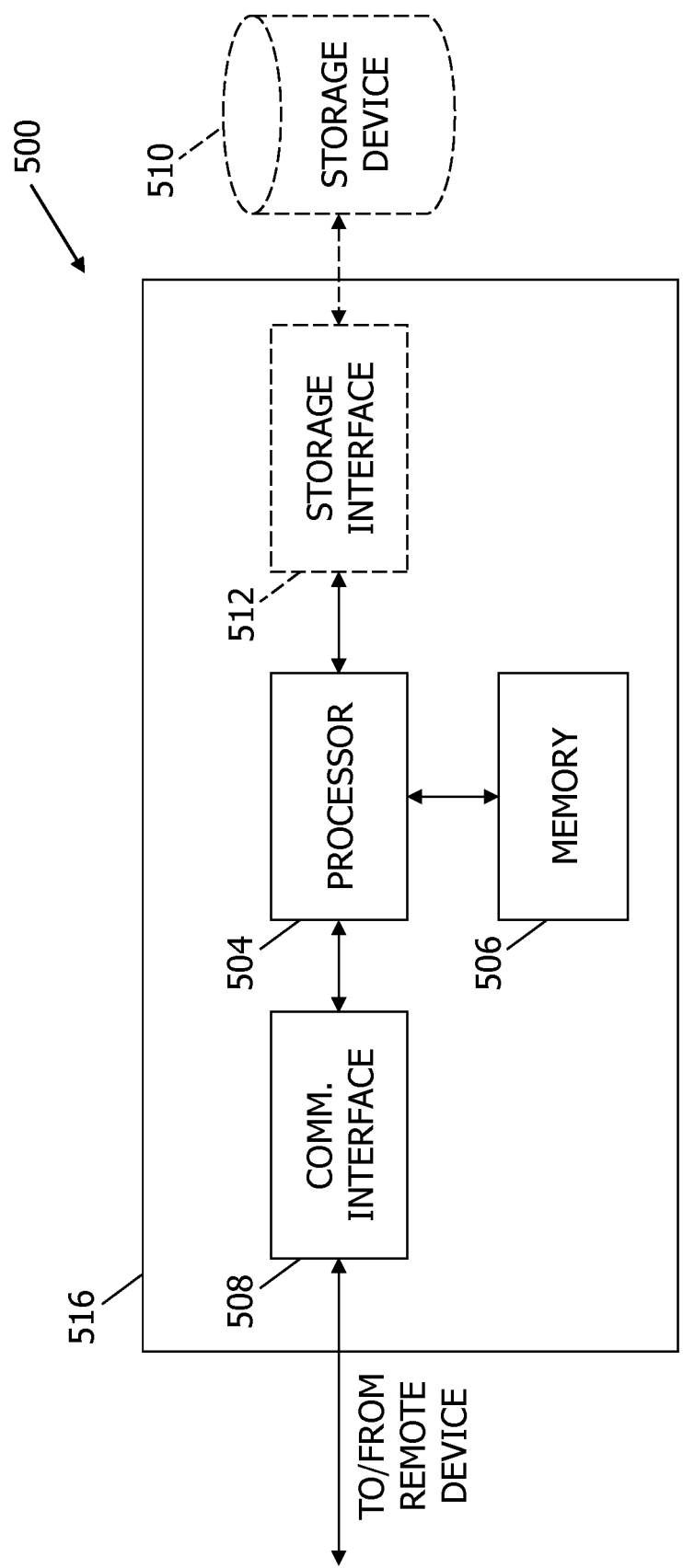
FIG. 5 is a schematic diagram of an example server computing device that may be used with the computer system shown in FIG. 3.

FIG. 5 illustrates an example configuration 500 of a natural language processing computing device 516 as shown in FIG. 3 that confers the speech to text conversion and voice capture of proper names with accurate spelling for each user or for proper names that are the subject of subsequent computing operations. The computing device 516 is sometimes referred to herein as a server-based network "host" device that manages natural language processing, associated phonetic algorithm data, information and rules for determining which of multiple spellings of a name applies for further use, speech to text conversions, and communication of digital text to external systems and applications. It is not strictly necessary, however, that in all embodiments that the host computing device is a server system.

As shown in FIG. 5, the host natural language processing computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that host natural language processing computing device 516 is capable of communicating with a remote device such as a third party account/registration system, a merchant portal, an issuing portal, a phonetic name database or any other device desired. For example, communication interface 508 may provide digital text to the third party account/registration system, the issuer portal, the merchant portal and/or another device via a network.

Processor 504 may also be operatively coupled to a storage device 510. Storage device 510 is any computer-operated hardware suitable for storing and/or retrieving data. In some embodiments, storage device 510 is integrated in host natural language processing computing device 516. For example, host natural language processing computing device 516 may include one or more hard disk drives as storage device 510. In other embodiments, storage device 510 is external to host natural language processing computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and data utilized in the speech to text conversions with voice capture of accurate spellings of proper names. In one embodiment, the database is centralized and stored on the server system 500. In an alternative embodiment, the database is stored remotely from the server system 500 and may be non-centralized. The database may include phonetic codes and identifiers for proper names having various different spellings but similar pronunciation, with rules and phonetic codes to utilize to identify which of the alternative spellings should be utilized in a speech to text conversion.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
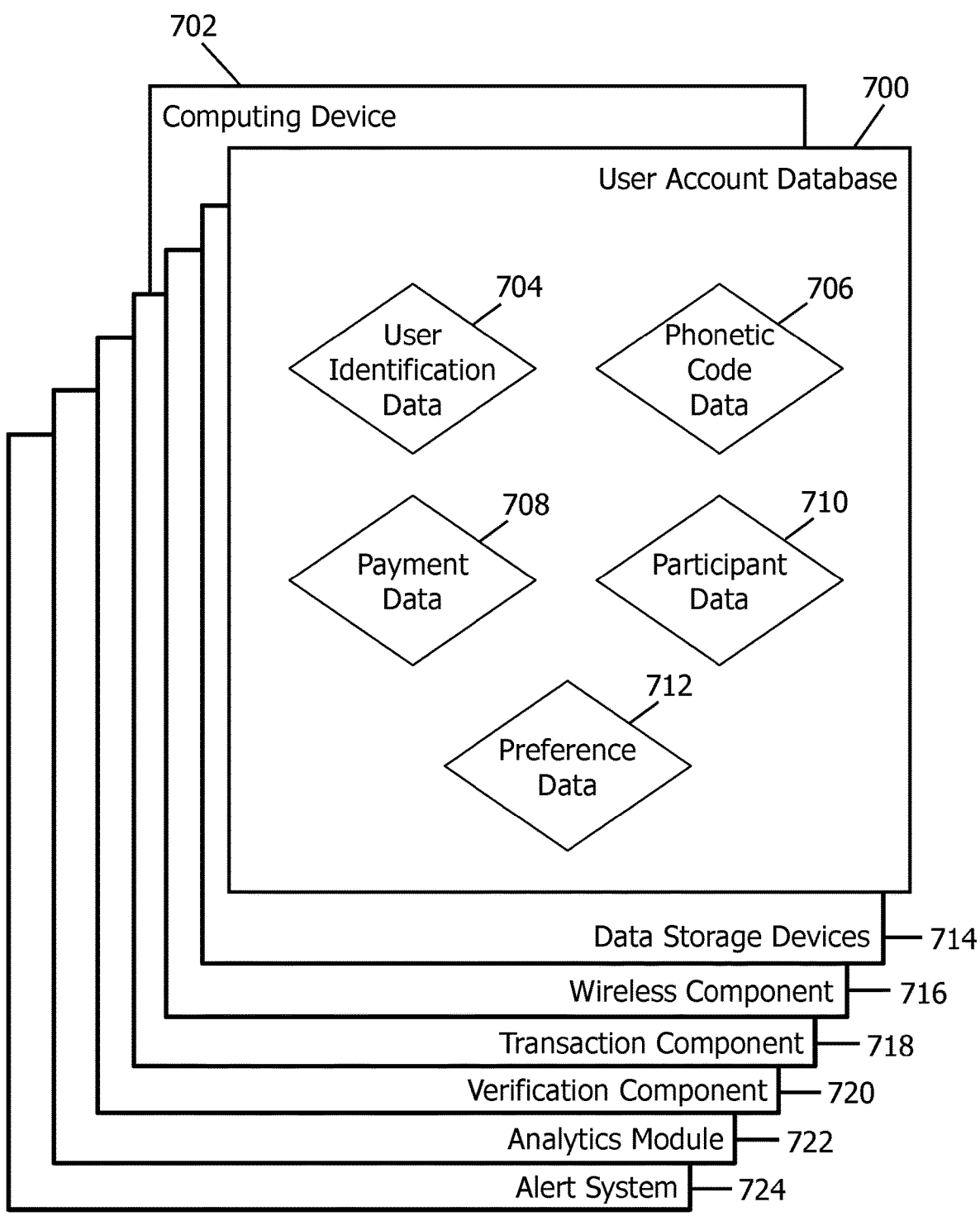
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, phonetic code and algorithm data 706, payment data 708, participant data 710, and preference data 712. In contemplated embodiments, user identification data 704 includes, but is not limited to, a user name, a user address, and a user phone number. Phonetic code and algorithm data 706 includes data associated with phonetic codes, identifiers and linked information regarding variant spelling of predetermined names, prompts and cues to verbally interpret phonetic sounds utter by a user or to verbally prompt a user, and speech to text conversion including accurately spelled proper names. Payment data 708 includes, but is not limited to, card information, payment history, and a billing address. Participant data 710 includes information associated with participating merchants, including merchant identifiers, address information, contact information, etc. Preference data 712 includes data associated with third parties and administrators providing support for the natural language processing and speech to text conversion services.

Computing device 702 includes the database 700, as well as data storage devices 714. Computing device 702 also includes a wireless component 716 and a transaction component 718 for correlating, for example, payment card transactions. An analytics module 722 is included for analyzing phonetic algorithm and spelling performance data for speech to text conversion or other items of interest. Further included is a verification module 720 that may communicate with a device in the payment network or another network, and an alert module 724 for transmitting an alert to a cardholder, merchant or an issuer, or to any other user or interested party in the case of system error, possible fraudulent activity, or other events of interest.

Figure 7:
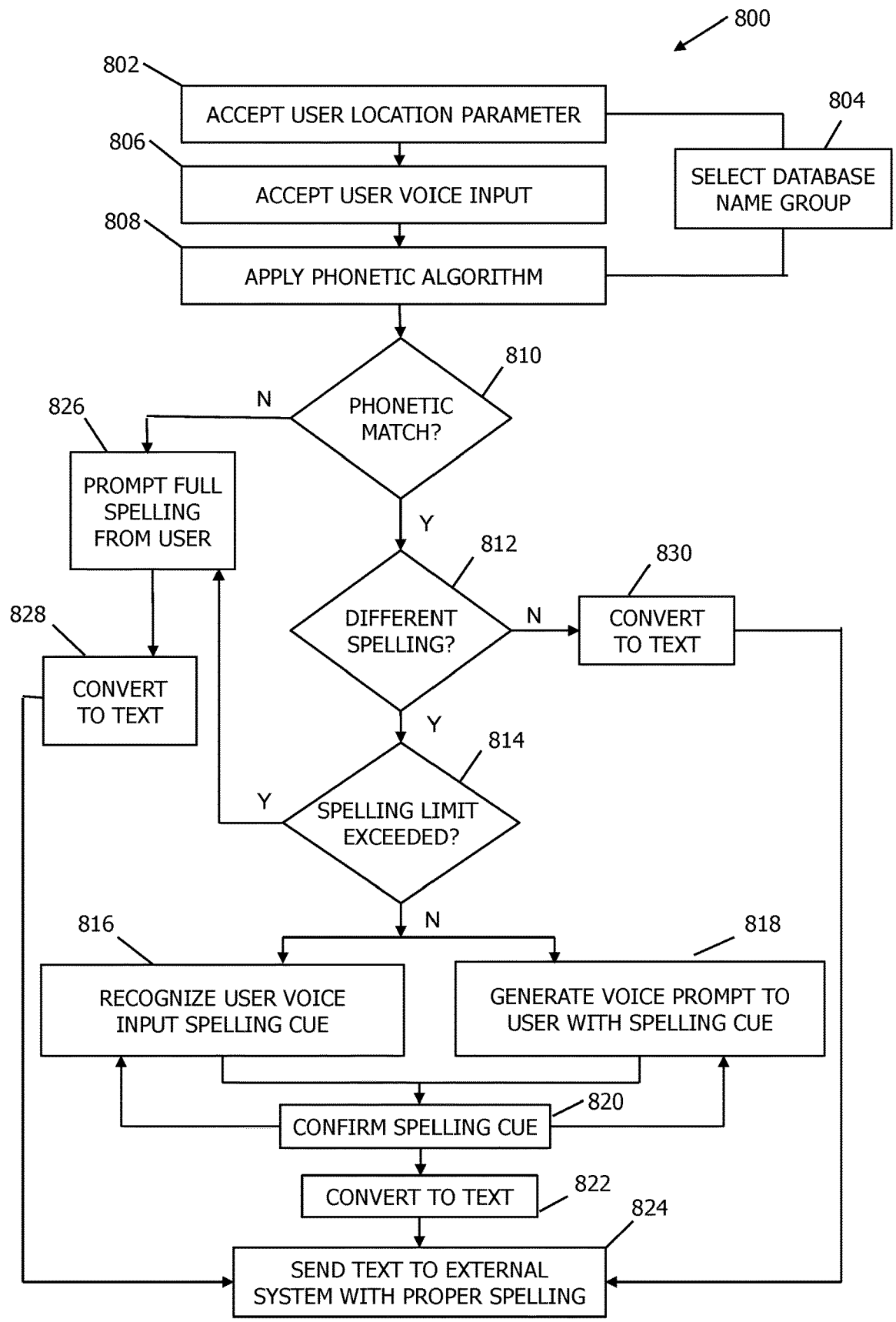
FIG. 7 shows an exemplary process of speech to text conversion including natural language capture of a spelling of a name for the systems and devices shown in FIGS. 1-6.

FIG. 7 shows an exemplary process 800 of electronically performing speech to text conversions via natural language processing in the systems shown and described in relation to FIGS. 1-3 including devices such as those of FIGS. 3-6. In the example shown, the process 800 is implemented by the natural language processing computing device in communication with an external system such as the third party account/registration system, one of the parties to the multi-party payment processing system and network for processing payment card transactions, or to another device for another application, and effectively captures accurate spelling of proper names needed by a spelling-dependent application.

At step 802 the natural language processing computing device accepts a location-based parameter for a user in any manner described above or in an alternative manner as desired. At step 804, the location-based parameter is utilized to select one or more the naming groups in the phonetic name database to identify and resolve alternative spellings of names spoken by the user. In some embodiments, however, naming groups may be optional and as such steps 802 and 804 may be considered optional.

At step 806, the natural language processing computing device receives a voice input or utterance of the user that concerns a proper name. The proper name may be, for example, a given name, a surname, a street name or a city name. At step 808 the natural language processing computing device applies the genetic algorithm to create a phonetic code for the received utterance of the user. The created phonetic code may then compared to the predetermined phonetic codes of proper names that are stored in the name database.

At step 810, the natural language processing computing device determines whether the created phonetic code matches any of the predetermined phonetic codes. If a match exists, the natural language processing computing device proceeds at step 812 to identify whether different spellings of the name corresponding to the matched phonetic code exist according to identifiers or linked information in the database. If different spellings exist, at step 814 the natural language processing computing device determines if the number of different spellings exceeds a predetermined limit.

If the number of different spellings is below the predetermined limit, the natural language processing computing device either applies the rule and algorithm for the phonetically encoded name to either recognize a voice input from a user of a natural language spelling cue at step 816 or generate a voice prompt to the user that includes a natural language spelling cue at step 818. As described above, the spelling cue in either case may relate to a consonant or a vowel in the actual spelling of the name as it pertains to the user or to the end application. Multiple rules, cues and prompts may be generated or recognized until the natural language processing computing device can converge on the correct spelling of the name.

At step 820 the natural language processing computing device confirms spelling cues or otherwise lets the user know that the proper spelling of the name is now understood. At step 822, the spoken name is converted to text with accurate spelling of the name, and at step 824 the text is sent as a digital input to an external system with proper spelling and to an application that depends on or otherwise requires proper spelling to satisfactorily operate.

If there is no phonetic match made at step 810, or if the number of spellings exceeds the limit at step 814, the natural language processing computing device prompts the user to spell the full name and captures the spelling one letter at a time. The proper spelling of the name is now understood, and at step 828 the spoken name is converted to text with accurate spelling of the name, and at step 824 the text is sent as a digital input to an external system. In some cases, the natural language processing computing device may be self-learning, such that once a name that was not initially recognized (or that was not included in the database) is spelled for the system it can be added to the name database and considered for future processing and identification by the natural language processing computing device.

If at step 812 there is not an alternative spelling of the name that exists according to the database, then at step 830 the spoken name is converted to text with accurate spelling of the name, and at step 824 the text is sent as a digital input to an external system. For short, simple names (e.g., Pam) indicating alternative spellings may not be needed, although creative name spelling trends do not necessarily render short and simple names immune from being mistakenly spelled in a speech to text conversion performed by a natural language processing system.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A speech to text conversion system comprising:
   a natural language processing computing device in communication with a phonetic name database, the natural language processing computing device configured to:
   receive, from a user computing device, at least one proper name uttered by a user;
   apply a phonetic code algorithm to the at least one proper name uttered by the user to create a phonetic code;
   compare the created phonetic code to a plurality of predetermined phonetic proper name codes stored in the phonetic name database, the comparison performed using at least one phonetic matching algorithm;
   in response to none of the plurality of predetermined phonetic proper name codes in the phonetic name database matching the created phonetic code in the comparison, i) provide another voice prompt to the user to speak a full spelling of the at least one proper name, and ii) add, in the phonetic name database, the full spelling of the at least one proper name received from the user in association with the plurality of predetermined phonetic proper name codes;
   in response to the created phonetic code matching one of the plurality of predetermined phonetic proper name codes in the phonetic name database, determine from the phonetic name database whether multiple different spellings of the matching predetermined phonetic proper name code exist;
   when multiple different spellings of the matching predetermined phonetic proper name code are determined to exist, either:
   apply, using the at least one phonetic matching algorithm, a first phonetic code string from the phonetic name database to recognize an utterance of the user providing a corresponding natural language cue regarding which of the multiple different spellings of the at least one proper name is correct, wherein the natural language cue includes a separate enunciation of i) the matching predetermined phonetic proper name code and ii) a letter that is unique to one of the multiple different spellings, wherein the first phonetic code string does not spell an entirety of the one of the multiple different spellings; or apply, using the at least one phonetic matching algorithm, the first phonetic code string to provide a voice prompt to the user including the corresponding natural language cue regarding which of the multiple different spellings of the at least one proper name is correct; and convert the matching predetermined phonetic proper name code to text including the correct one of the multiple different spellings of the at least one proper name.

2. The system of claim 1, wherein the natural language processing computing device is further configured to:
apply the first phonetic code string wherein the natural language cue further includes an enunciation of a connecting phrase between i) the matching predetermined phonetic proper name code and ii) the letter that is unique to the one of the multiple different spellings, wherein the connecting phrase is one of "with a", "with an", "without a", "without an", and "with no".

3. The system of claim 1, wherein the natural language processing computing device is further configured to:
apply the first phonetic code string wherein the natural language cue further includes the letter that is unique being a consonant.

4. The system of claim 1, wherein the natural language processing computing device is further configured to:
provide the voice prompt to the user including the letter that is unique being a vowel.

5. The system of claim 1, wherein the natural language processing computing device is further configured to:
provide the voice prompt to the user including a plurality of successive natural language prompts that when answered by the user converge on the correct one of the multiple different spellings of the at least one proper name.

6. The system of claim 1, wherein the natural language processing computing device is further configured to:
if a number of the multiple different spellings exceeds a predetermined limit, provide the voice prompt to the user instructing the user to speak a full spelling of the at least one proper name.

7. The system of claim 1, wherein natural language processing computing device is further configured to:
create the phonetic code using the at least one phonetic matching algorithm, the at least one phonetic matching algorithm including at least one of a Soundex phonetic algorithm, a Metaphone phonetic algorithm, and a Beider-Morse phonetic matching algorithm.

8. The system of claim 1, wherein the natural language processing computing device is further configured to:
obtain at least one location-based parameter of a user; and
select one of a plurality of name groupings in the phonetic name database based upon the obtained at least one location-based parameter.

9. The system of claim 1, wherein the natural language processing computing device is further configured to:
provide a confirming voice response to the user including a natural voice acknowledgment of a proper spelling of the at least one proper name.

10. The system of claim 1, wherein the natural language processing computing device is further configured to:
send the converted text to an external computer system as a digital input.

11. The system of claim 1, wherein the natural language processing computing device is further configured to:
send the converted text to a multi-party payment network system for processing a payment card transaction.

12. A method for electronically converting speech to text, the method implemented with at least one host computing device having at least one processor in communication with a phonetic name database, the method comprising:
receiving, by the at least one host computing device from a user computing device, at least one proper name uttered by a user;
applying, by the at least one host computing device, a phonetic code algorithm to the at least one proper name uttered by the user to create a phonetic code;
comparing, by the at least one host computing device, the created phonetic code to a plurality of predetermined phonetic proper name codes stored in the phonetic name database, the comparison performed using at least one phonetic matching algorithm;
in response to none of the plurality of predetermined phonetic proper name codes in the phonetic name database matching the created phonetic code in the comparison, i) providing another voice prompt to the user to speak a full spelling of the at least one proper name, and ii) adding, in the phonetic name database, the full spelling of the at least one proper name received from the user in association with the plurality of predetermined phonetic proper name codes;
in response to the created phonetic code matching one of the plurality of predetermined phonetic proper name codes in the phonetic name database, determining, by the at least one host computing device from the phonetic name database, whether multiple different spellings of the matching predetermined phonetic proper name code exists;
when multiple different spellings of the matching predetermined phonetic proper name code are determined to exist, either:
applying, by the at least one host computing device using the at least one phonetic matching algorithm, a first phonetic code string from the phonetic name database to recognize an utterance of the user providing a corresponding natural language cue regarding which of the multiple different spellings of the at least one proper name is correct, wherein the natural language cue includes a separate enunciation of i) the matching predetermined phonetic proper name code and ii) a letter that is unique to one of the multiple different spellings, wherein the first phonetic code string does not spell an entirety of the one of the multiple different spellings; or
applying, by the at least one host computing device using the at least one phonetic matching algorithm, the first phonetic code string to provide a voice prompt to the user including the corresponding natural language cue regarding which of the multiple different spellings of the at least one proper name is correct; and
converting, by the at least one host computing device, the matching predetermined phonetic proper name code to text including the correct one of the multiple different spellings of the at least one proper name.

13. The method of claim 12, further comprising:

applying, by the at least one host computing device, the first phonetic code string wherein the natural language cue further includes an enunciation of a connecting phrase between i) the matching predetermined phonetic proper name code and ii) the letter that is unique to the one of the multiple different spellings, wherein the connecting phrase is one of "with a", "with an", "without a", "without an", and "with no".

14. The method of claim 12, further comprising:

applying, by the at least one host computing device, the first phonetic code string wherein the natural language cue further includes the letter that is unique being one of a consonant and a vowel.

15. The method of claim 12 further comprising:

if a number of the multiple different spellings exceeds a predetermined limit, providing the voice prompt to the user instructing the user to speak a full spelling of the at least one proper name.

16. The method of claim 12, further comprising:

creating the phonetic code using the at least one phonetic matching algorithm, the at least one phonetic matching algorithm including at least one of a Soundex phonetic algorithm, a Metaphone phonetic algorithm, and a Beider-Morse phonetic matching algorithm.

17. The method of claim 12, further comprising:

obtaining at least one location-based parameter of a user; and selecting one of a plurality of name groupings in the phonetic name database based upon the obtained at least one location-based parameter.

18. The method of claim 12, further comprising:

providing a confirming voice response to the user including a natural voice acknowledgment of a proper spelling of the at least one proper name.

19. The method of claim 12, further comprising:

sending the converted text to an external computer system as a digital input.

20. The method of claim 12, further comprising:

sending the converted text to a multi-party payment network system for processing a payment card transaction.

* * * * *